Feb. 15, 1938. E. C. HILLMAN 2,108,713
GRID
Filed May 15, 1936
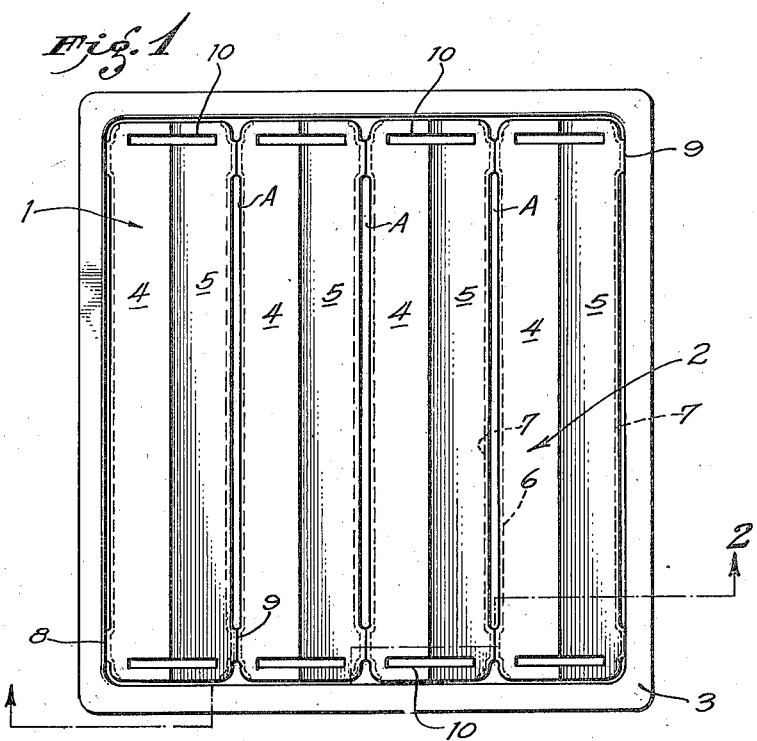
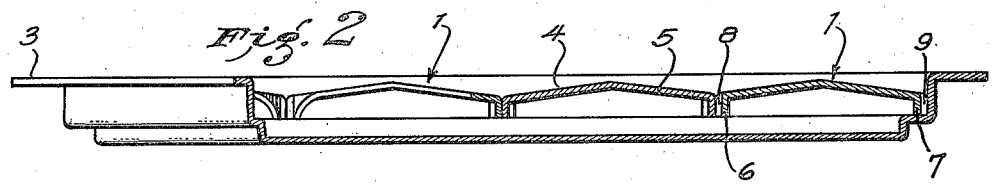
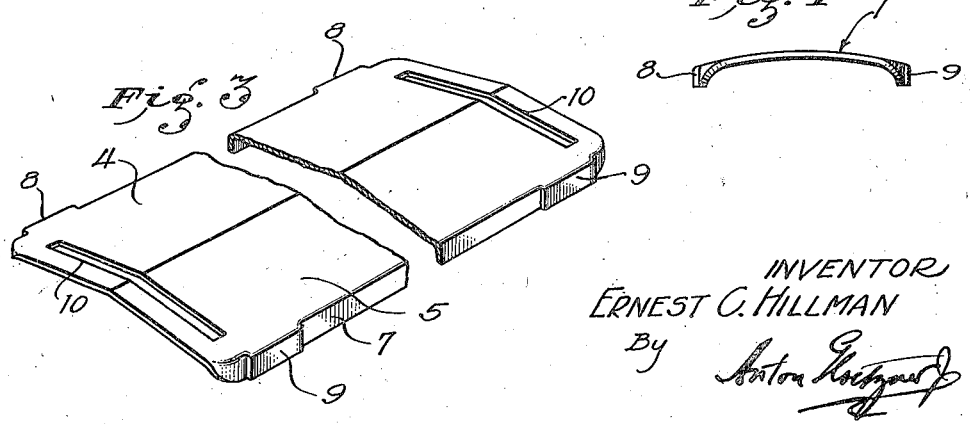
INVENTOR
ERNEST C. HILLMAN
By
ATTORNEY Patented Feb. 15, 1938

2,108,713

UNITED STATES PATENT OFFICE 2,108,713

GRID

Ernest C. Hillman, Los Angeles, Calif.

Application May 15, 1936, Serial No. 79,910

8 Claims. (Cl. 53—5)

This invention relates to a device for holding articles of food in such relation to a superimposed source of heat within the broiling compartment of an oven that they are cooked by the process of grilling or broiling.

The invention relates particularly to a grid usable in the broiler chamber of a stove for the purposes stated, in association with a pan or other receptacle for collecting the fluids as they are liberated during the cooking operation.

Broiler grids of present day construction consist of spaced bars, plates with grooves, plates with perforations, and a variety of other forms and designs, none of which provides a surface that may be fully contacted by the food to be broiled. It is a desirable practice preliminary to sear meats and other flesh foods to seal in them their natural juices before subjecting them to cooking process by broiling and it is impossible satisfactorily to accomplish this treatment of searing with the present grids that present a close succession of regularly interrupted surfaces.

One of the prime objects of this invention, therefore, is to provide a grid in which substantially the entire surface is contacted by the food to be cooked, and from which the drainage of fluids, as greases and juices, is continuous and immediate upon release of same during the broiling operation, whereby no cooking of the food occurs in these fluids, and especially in the greases.

Another object of the invention is to provide a broiler grid of the character stated which may be readily and easily and thoroughly cleaned, and other objects will appear from the specification following in connection with the accompanying drawing, in which Fig. 1 is a plan view showing my invention.

Fig. 2 is an enlarged section on line 2—2, Fig. 1, looking in the direction of the arrow.

Fig. 3 is an enlarged perspective view showing one of the component sections of the grid, and Fig. 4 is an enlarged end view of a modified form of one of the sections.

My invention, in a general sense, comprises a grid composed of a series of plates so formed as to facilitate a ready and quick gravitation of released fluids thereover and therefrom, the plates being spaced for draining the fluids into a pan in which these fluids are collected, and upon which the grid is supported.

Specifically the invention comprises a series or plurality of individual units, sections or plates 1, arranged for association with one or more other sections to form a composite grid 2, shown in Fig. 1, that is arranged to be supported in any desirable manner, as by a pan 3, or other collector. Each individual unit 1, is a relatively thin, elongated, imperforate plate, having two planes 4 and 5, inclining laterally from the edges to the center thereof, and providing a pair of oppositely inclined surfaces from which the greases and other fluids gravitate into the pan 3 immediately upon release of same thereby preventing any frying of the food upon the units, which when assembled, offer substantially a continuous surface, providing thereby a heating area for complete contact by the food without in any wise impairing the easy drainage of grease and other fluids.

The plates or sections 1, may be curviform in cross-section, as shown in Fig. 4, it being necessary only that they be higher at the median, longitudinal line than at the sides for purposes of grease draining.

The sides of the units or plates 1 are formed or provided with downwardly extended longitudinal re-inforces constituting supports 6 and 7, and these re-inforces additionally prevent the plates from warping. At each end, these downwardly directed supports 6 and 7 are each formed or provided with lugs or projections 8 and 9, which, when the units 1 are assembled in associated relation, hold separated the respective edges of the supports 6 and 7 of the individual units and thereby provide spaces A through which the greases and fluids from the broiling or searing food run into the collecting pan 3.

Each unit 1 constitutes a smooth, imperforate body and therefore may be readily and quickly cleaned. Obviously where all the units are not required for broiling, the unnecessary one or ones may be dispensed with, thus obviating the necessity for cleaning the entire grid. Preferably each unit 1, at each end thereof, is provided with a slot 10, for a lifter or other device in removing one or all of the units from the stove.

What I claim, is:

1. A grid of the character disclosed, comprising, in combination with a pan, a series of individual sections forming substantially a continuous surface, and each section having means co-operating with means on other sections for spacing same.

2. A grid of the character disclosed, comprising, in combination with a pan, a series of individual, elongated sections associated laterally to form a continuous surface, and each section having lateral means for separating said sections and providing spaces between same.

3. A grid of the character disclosed, comprising, in combination with a pan, a series of individual sections, the sections severally being sloping planes, and provided with means to space the sections relatively to each other.

4. A grid of the character disclosed, comprising in combination with a pan, a series of sectional, imperforate plates, each provided with downwardly extending sides and with means for relatively separating said plates to provide spaces between same.

5. A grid comprising, in combination with a pan, a series of individual units severally co-operating to form a continuous surface, each unit at the median, longitudinal line thereof being higher than at the sides thereof to form draining surfaces, the sides of each of said units being provided with means for relatively spacing said units.

6. A grid comprising, in combination with a pan, a series of individual units co-operable to form a continuous surface, each unit at the median, longitudinal line thereof being higher than at the sides thereof, and the edges of said units being provided with longitudinal reinforces and supports.

7. A grid comprising, in combination with a pan, a series of individual units co-operable to form a smooth, continuous surface, each unit at the median longitudinal line thereof being higher than at the sides thereof, the edges of said units being provided with longitudinal reinforcements and supports, and the reinforcements being provided with projections for co-operation with projections of other units to separate the respective re-inforcements of the units and thereby provide spaces between same.

8. A grid of the type disclosed comprising, in combination with a pan, a series of individual sections, each consisting of longitudinal units of inclined planes joined centrally and forming a continuous surface, and the ends of each of the edges of said planes being laterally extended to co-operate with the edges of other sections and form spaces between said extensions and units.

ERNEST C. HILLMAN.